June 15, 1965 K. WANDEL 3,188,942
APPARATUS FOR DISINTEGRATING AND DEWATERING FIBROUS MATERIAL
Original Filed March 22, 1954 2 Sheets-Sheet 1

INVENTOR.
KURT WANDEL
BY
ATTORNEYS

June 15, 1965     K. WANDEL     3,188,942
APPARATUS FOR DISINTEGRATING AND DEWATERING FIBROUS MATERIAL
Original Filed March 22, 1954     2 Sheets-Sheet 2
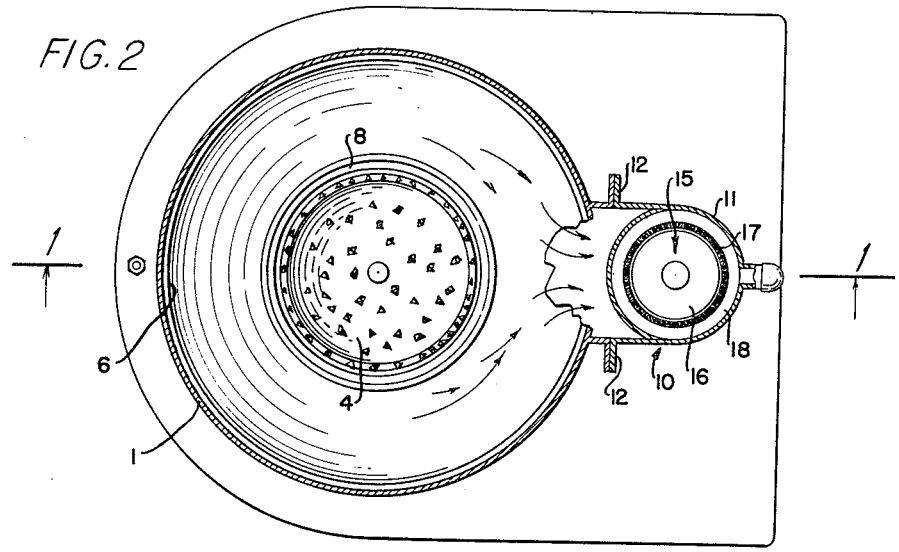
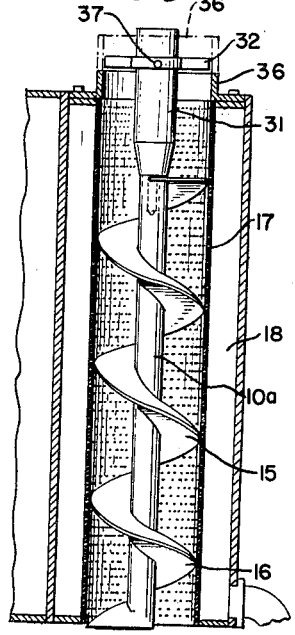
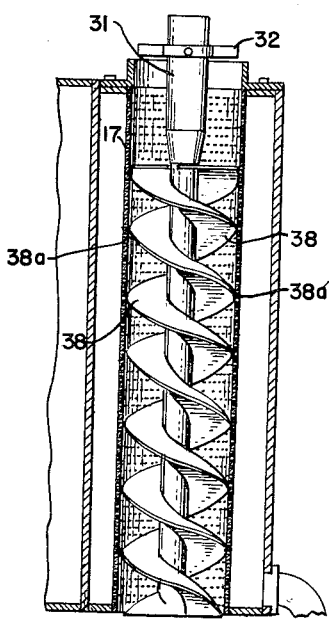
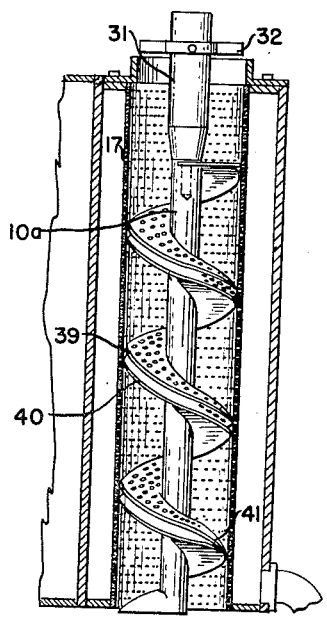
INVENTOR.
KURT WANDEL
BY
*Pennie, Edmonds, Morton, Barrows & Taylor*
ATTORNEYS

United States Patent Office 3,188,942
Patented June 15, 1965

3,188,942
APPARATUS FOR DISINTEGRATING AND DEWATERING FIBROUS MATERIAL
Kurt Wandel, Downingtown, Pa., assignor to Somat Corporation, Coatesville, Pa., a corporation of Delaware
Continuation of application Ser. No. 417,729, Mar. 22, 1954. This application Dec. 5, 1962, Ser. No. 244,541
9 Claims. (Cl. 100—72)

This invention relates to improvements in apparatus for disintegrating and dewatering fibrous material such as waste paper and the like, and more particularly constitutes an improvement on the apparatus described and claimed in my Patent No. 2,729,145 granted January 3, 1956, on an application co-pending with application Serial Number 417,729 filed March 22, 1954 (now abandoned), of which this application is a continuation.

The machine constituting the subject matter of my prior patent is particularly designed for the destruction of confidential documents but is equally useful for disposing of the various kinds of discarded paper which in the usual routine of business is periodically collected and destroyed. With my improved apparatus as described herein, the disintegration and dewatering of waste paper may be carried out continuously as a single operation, thereby greatly increasing the capacity of the machine and reducing the labor involved.

My improved machine is also particularly designed to carry out the method of garbage disposal described and claimed in my Patent No. 2,699,629, issued January 18, 1955. By the use of my improved apparatus, the unscreened garbage and rubbish is continuously reduced to a fairly dry fibrous mass which is inodorous and no longer subject to putrefaction, which may be used immediately as a fertilizer or stored for long periods without significant loss of plant food value. My improved apparatus serves also to screen out of the garbage and waste paper solid articles not subject to disintegration, such as wood, string, wire, rags, tin cans and the like, and to retain such articles for a long period without injury to the machine or interference with its efficient operation, whereby an occasional shut down of the machine for a brief period to dump the accumulated metal and other articles which have resisted disintegration is all the attention that is required other than feeding the waste paper, garbage, etc. to the machine, and removing the disintegrated and dewatered mass which may be fed directly into burlap bags such as now used for various kinds of prepared fertilizers or may be stored in bulk form for bacterial action and conversion into humus or organic fertilizer. The pulp generated by this apparatus from cellulosic material, for example, waste paper, is in a new form. The cellulosic fibers are in small lumps which are loose upon each other, crumble readily and are dry enough to be handled by ordinary conveying equipment such as used for grain and the like. The pulp may be conveyed into and stored in silos whereas in the case of fibers to be used in paper making it may be left not only for tonnage storage but for a period of bleaching action.

In the accompanying drawings I have illustrated my improved apparatus in the form in which it is now designed for the destruction of waste paper and the disposal of garbage.

In said drawings:

FIG. 2 is a transverse section on line 2—2 of FIG. 1;

FIGS. 3 to 7 are detail views of different parts of the apparatus which will be later described.

Figure 1:
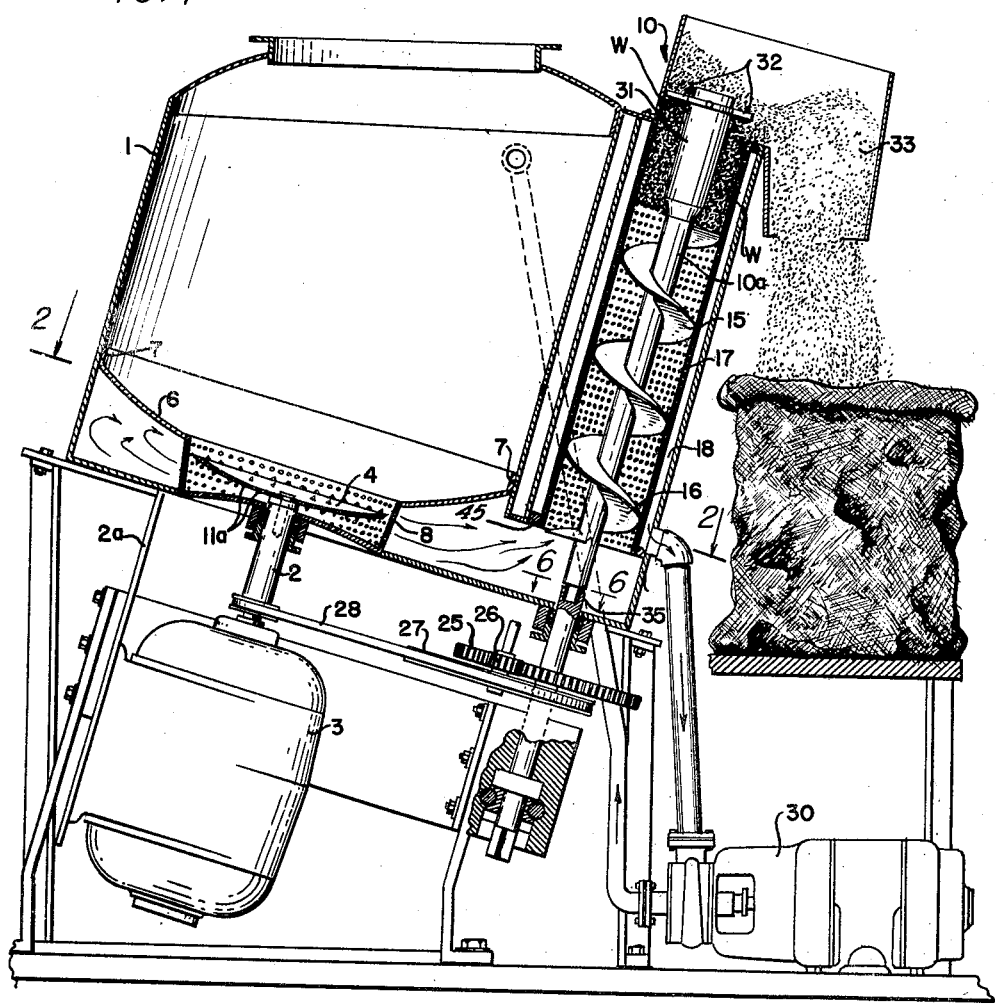
FIG. 1 is a vertical sectional view on a plane extending diametrically through the axis of the disintegrator and also the axis of the dewatering attachment as indicated by line 1—1 of FIG. 2.

Referring to the drawings, and particularly to FIGS. 1 and 2, 1 indicates the tank or shell into which the material to be disintegrated is dumped. This shell is preferably mounted on its frame 2a with its vertical axis inclined to the vertical at an angle of approximately 15°. Mounted in a suitable bearing in the bottom wall of the vessel 1 is a shaft 2 of a driving motor 3 by means of which the impeller 4 is continuously rotated at the desired speed of approximately 1500 r.p.m. The rotor employed is of the form disclosed in my above-mentioned Patent No. 2,729,145 that is to say, it comprises a concave steel disk of a diameter about equal to the radius of the vessel 1. It is attached to the end of the driving shaft 2 with its concave face uppermost, and firmly embedded in the face of the impeller, particularly around the rim thereof, are discrete particles of tungsten carbide, all as described and claimed in my Patent No. 2,641,165, dated June 9, 1953.

The machines disclosed in my prior patent and patent applications are designed for carrying out batch processes. That is to say, the machine is charged with the desired quantity of material to be disintegrated, the necessary water is added and the machine started and continued in operation until the disintegration is effected. The disintegrated mass is discharged then and the operation repeated. In order to adapt the machine for continuous operation, the tank 1 is provided with a double bottom, which may be conveniently accomplished by adding to the flat-bottomed tank an inner concave partition member 6 which is welded around its rim 7 to the wall of the tank 1 and at its center is provided with a downwardly extending perforated sleeve 8 surrounding the impeller and extending to the bottom wall of the casing. The perforated sleeve 8 serves as a sieve to retain in the vessel 1 and in contact with the impeller the partially disintegrated masses of material until they are sufficiently reduced to pass through the holes of the sieve. In order to continue the disintegration of material which is drawn beneath the impeller but is still of a size too large to pass through the perforations of the sleeve 8, the under face of the impeller, that is, its convex face, is also studded with tungsten carbide crystals, as shown at 11a.

In order to dewater the suspension of disintegrated fibers after they pass through the sleeve 8, I provide a dewatering attachment, indicated generally by the numeral 10, which is preferably bolted or otherwise attached to the side wall of the vessel 1, as shown more particularly in FIG. 2. This dewatering attachment comprises a casing 11 having a base portion which is open at one side and provided with a flange 12 for attachment to a similar flange formed on the side wall of the vessel 1 which is lowermost when the vessel is set in the inclined position in which it is mounted on the frame. The thus connected extensions of the tank and dewatering unit provide an open passage from the space of the tank 1 surrounding the sieve 8 into the casing 11 of the dewatering unit 10 whereby the water with the disintegrated fiber in suspension as discharged through the holes of the part 8 flows by gravity aided by the centrifugal pressure exercised by the impeller 4 into the space at the bottom of the casing 11.

Axially mounted in the cylindrical portion of the casing 11 of the dewatering unit is a lifting screw 15 of the character commonly employed in screw conveyors. The bottom edge of the spiral vane 16 which forms the screw lies in the plane of the top wall of the passage into the dewatering unit so that the screw serves to continuously lift the water suspension as it rises in the dewatering unit upwardly when the screw is rotated in the direction indicated by the arrows in the drawing. Surrounding the screw within the casing 11 is a perforated metal sleeve 17 of a size sufficiently larger than the diameter of the screw to permit free rotation of the screw therein. The sleeve 17 is of a diameter somewhat less than that of the cylindrical portion of the casing so that the free water in the suspension of fibrous material as it is lifted by the screw may drain freely through the perforations of the sleeve 17 into the surrounding space 18 from which it is continuously returned to the interior of the tank 1. The space between the sleeve 17 and the cylindrical portion of the casing 11 is closed by an annular water-tight partition 4s, as shown in FIG. 1.

Any suitable means may be employed for driving the several parts of the apparatus. In the particular model shown in the drawings, the shaft 10a of the elevating screw is provided with a driving gear 25 which is driven by a pinion 26 on the hub of a pulley 27 which in turn is driven from the shaft of the driving motor 3 by a belt 28. The speed of rotation of the screw is somewhat in proportion to its diameter, the smaller diameters operating at 60 to 70 r.p.m. with the larger units reduced to the order of 40 r.p.m. Any other suitable driving mechanism may be substituted if desired. The pump 30 which serves to continuously recirculate the water extracted from the suspension may also be driven from the main driving motor if desired, but for convenience of assembly I prefer to use a centrifugal pump provided with its own driving motor, as shown.

The elevating screw terminates several inches below the top of the casing 11 and its shaft is provided at its upper end with an extension 31 of enlarged diameter, which extension projects above the casing 11 and carries at its upper end a pair of oppositely projecting radial blades 32 which serve to continuously break up the ascending dewatered fibrous material so that it will flow by gravity into the discharge chute 33, whence it may pass directly into bags or other receptacles or onto a discharge conveyor if the dewatered material is to be further handled in bulk.

The shaft of the elevating screw is preferably made of two sections providing for slight lateral movement of the elevating screw with respect to the driving portion of the shaft. This may be accomplished by providing, as illustrated at 35 in FIG. 6, a squared extension on the end of the driving shaft projecting into a similarly shaped but slightly larger recess in the end of the shaft of the elevating screw. This slight lost motion is desirable to permit the elevating screw to "float" in the perforated shell so that it will rest of its own weight against the inner face of the sleeve at the right side of the sleeve, as shown in FIG. 1.

The greater portion of the water removed from the suspension passes through the perforated sleeve along this lower side of the sleeve and by permitting the screw to rest against the sleeve in this fashion a close contact is provided without danger of binding or causing any significantly greater wear on the face of the sleeve.

The operation of the device when employed for the treatment of garbage will now be described. The garbage, without sorting, is discharged into the tank 1 and water added, the fluid and material being in such amount as to about half fill the tank 1 and to provide a water content of about 96%. The machine is then set in operation and for the first several minutes the liquid which flows through the holes in the sieve 8 is substantially free of suspended matter. When the level of this liquid rises above the intake of the pump 30 the liquid is pumped back into the tank 1. As the operation proceeds the amount of suspended matter in the liquid flowing into the dewatering unit increases and the amount of fibrous material accumulates in the dewatering apparatus until there is formed at the top of the screw a wad or layer of fibrous material against the lower face of which constant additions are made by the upward pushing of the screw. This wad of fibrous material, shown at W in the drawing, serves as a porous bed against which the elevated material is pressed, thereby expressing from it liquid in addition to what has drained out of the mass in its upward passage over the screen cylinder 17. This wad W resists upward movement due to the compression effected by the enlarged diameter of the top portion of the screw shaft aided by its friction against the surface of the screen 17 and hence by varying the thickness of the wad W the resistance to movement of the wad can be varied, thus increasing or decreasing the pressure to which the increments of material compressed against the bottom of the wad are subjected to express the additional liquid.

I have found that while it is difficult to express water from an aqueous suspension of disintegrated fiber against a perforated or screened surface without considerable loss of fiber and without clogging the screen, additional water may be readily squeezed out of such fibers by the structure shown wherein the expressed liquid may drop off of the under face of the mass of material by gravity. The water thus squeezed out of the increments of fibers pressed against the wad by the rotation of the conveyor drains away from the mass merely by gravity, so that the contained fibrous matter will be caught by the screen and continuously fed upward by the conveyor, the water passing through the screen into the casing 11 whence it is returned to the vessel 1 by the pump 30. In the practical operation of the apparatus illustrated, from 50 to 90% (according to the nature of the material) of the water content of the suspension as it leaves the tank 1 is removed and returned to the tank 1.

After sufficient material has been fed into the tank for continuous discharge, additional material may be added continuously to the vessel 1 in such increments as are convenient to handle, enough water being added to replace the water carried away in the partially dewatered mass. This may be very little or none at all, depending upon the water content of the material being handled. In case of garbage, the water returned from the dewatering unit is usually sufficient to maintain the desired ratio of water and solids of 96% to 4%.

In FIG. 3 I have shown a modification of the apparatus above described to provide adjustment in the resistance to upward movement of the wad of dewatered fiber at the top of the dewatering unit. This is desirable to permit a single apparatus to be adjusted to suit the requirements of different types and material handled in the apparatus. As shown in FIG. 3, this adjustment is accomplished by providing a short sleeve or collar 36 of an internal diameter equal to that of the perforated shell 17, which collar is attached to the upper end of the dewatering column to thereby increase the height of the wad W of dewatered material. Several sleeve sections of varying length may be provided to give a range of adjustment. Also, the blades 32 at the upper end of the shaft extension are made axially adjustable by means of a set screw 37 so as to operate properly with different lengths of sleeve extensions.

The elevating screw may be a simple solid helical vane as shown in FIGS. 1 and 2 or may consist of two such vanes to double the lifting vanes per unit of screw length without decreasing the pitch of the screw. This double screw is particularly desirable with materials where the fiber content is low, such as garbage of low paper content. A short section of a screw of the character described is shown in FIG. 4. The two vanes 38 and 38a are set at right angles to each other so as to provide equal spacing between the two vanes.

I have also found it an advantage in some instances to increase the perforated areas through which the water may pass out of the garbage or other fibrous material. To this end, as shown in FIG. 5, I may provide a lifting screw with two vanes 39 and 40 spaced closely together and with the upper vane perforated with fine holes preferably of smaller diameter than those in the sleeve 8. The two vanes are brought together at the lower end of the elevating screw as shown at 41, so that the water which passes through the perforations in the upper screw from the material as it tends to move relatively to the vane surface will not flow back into the un-dewatered pulp at the bottom of the elevated screw. The water which flows through the perforations in the upper vane will be comparatively free of fiber and will pass readily through the perforations of the sleeve.

Figures 6, 7:
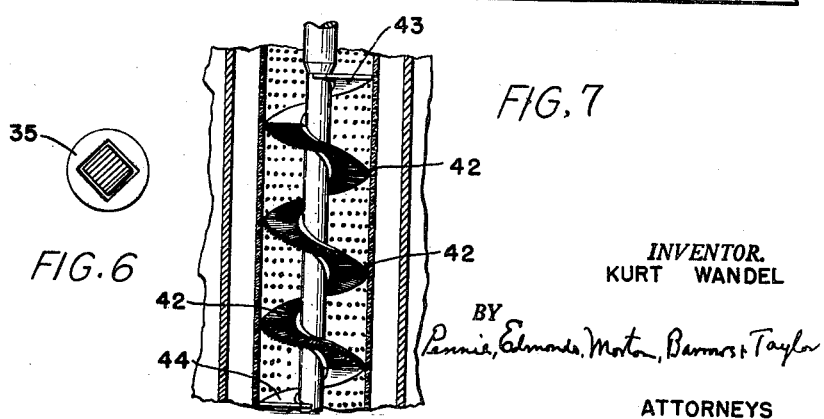

In FIG. 7 I have disclosed a further modification of my improved machine which is particularly advantageous when the material treated contains fine fibers or colloidal matter which tends to clog the perforations of the sleeve 17. As here shown the helical vane of the elevating screw is formed of stiff bristles 42 projecting radially from a channel shaped base which is wound around the shaft of the screw end welded or otherwise attached thereto. The channel shaped base is clamped against the base of the bristles to hold them firmly in place.

The upper end of the screw for about one-half turn is formed of metal as in the previously described structure, as is also the lower portion 44 of the screw. The upper portion 43 serves to pack the dewatered material into the wad W and push the same upwardly out of the top end of the sleeve and for this purpose the metal blade is preferable. The lower portion of the screw 44 serves to scrape off the upper face of the disintegrated mass at the bottom of the sleeve and for this purpose also the metal blade is preferable. The mid portion of the vane where the bristles are provided serves without deformation of the bristles to elevate the disintegrated mass and the bristles serve to keep the perforations of the sleeve clean of all accumulated fibrous and solid matter which might otherwise adhere thereto and clog up the perforations.

The bristles may be stiff natural bristles or may be formed of synthetic materials or of metal. They should be stiff enough to lift the layer of material without bending downward to any significant extent. The bristles also serve to allow for the drainage of water through the vanes as in the modification shown in FIG. 5.

In the foregoing specification I have described my apparatus as applied to the treatment of garbage, but it will be understood that the apparatus has equal advantages in the disintegration and dewatering of waste paper, whether for the destruction of the documents or for generating pulp for the paper industry. The continuous operation of the apparatus with the continuous return of the water or other liquid employed gives the machine a greater capacity, saves water and also produces a new form of pulp which is dry enough to be handled in bulk and may be supplied directly to the paper machines, thus avoiding the excessive cost of large tank capacity now required. My improved machine may also be employed with advantage in all types of industry where disintegrating and dewatering steps are required.

I claim:

1. Apparatus for the continuous disintegration and dewatering of fibrous material comprising a disintegrating vessel, a distintegrating impeller in the bottom of said vessel, an outlet passage in a wall of said vessel at the bottom thereof, a dewatering chamber adjacent said vessel having an inlet opening in a wall thereof forming the end of said outlet passage, said chamber containing means for moving said material therethrough and compressing the same, including an elevating screw mounted for rotation in said chamber, a cylinder of foraminous material surrounding said screw, a solid wall of said chamber surrounding said cylinder and spaced therefrom, a watertight partition between said cylinder and said wall at the bottom of said cylinder, means for continuously rotating said impeller and said elevating screw and means for returning water collected between said cylinder and said solid wall to said vessel.

2. The apparatus of claim 1 wherein a screen is interposed in said outlet passage between said vessel and said chamber.

3. The apparatus of claim 2 wherein said screen consists of a false bottom in said vessel, said bottom having a downwardly extending perforated sleeve surrounding said impeller.

4. The apparatus of claim 3 wherein the bottom wall of said vessel extends beyond said false bottom and said elevating screw is mounted in the extension of said bottom wall.

5. The apparatus of claim 3 wherein the bottom wall of said vessel is at an angle to the horizontal and extends beyond one side wall of said vessel at its lower side, said extension forming the bottom of the dewatering chamber.

6. The apparatus of claim 1 wherein said elevating screw extends upwardly alongside said vessel and the solid wall surrounding said cylinder and said screw is attached to a side wall of said vessel.

7. The apparatus of claim 1 wherein the foraminous cylinder extends beyond the discharge end of said screw.

8. The apparatus of claim 7 wherein the elevating screw consists of a shaft and a helical elevating vane and the shaft of the screw beyond the elevating vane is enlarged.

9. The apparatus of claim 1 wherein the elevating screw extends upwardly from the bottom of said chamber at an angle to the vertical.

References Cited by the Examiner

UNITED STATES PATENTS

| 305,142 | 9/84 | Burckhardt | 198—213 X |
|---|---|---|---|
| 355,625 | 1/87 | Stevens | 162—284 |
| 1,083,013 | 12/13 | Hettinger | 100—145 X |
| 1,130,149 | 3/15 | Conway | 100—145 X |
| 1,488,219 | 3/24 | Shartle | 241—76 |
| 1,529,750 | 3/25 | Plate | 198—213 X |
| 1,653,831 | 12/27 | Archidiacano | 100—145 |
| 2,340,009 | 1/44 | Meakin | 100—43 |
| 2,408,191 | 9/46 | Barnett et al. | 100—72 |
| 2,641,971 | 6/53 | Ellis | 241—74 |
| 2,970,776 | 2/61 | Buckman | 241—46.1 |

FOREIGN PATENTS 166,527 8/22 Great Britain.

WALTER A. SCHEEL, *Primary Examiner,*

A. G. STONE, *Examiner.*